(12) United States Patent
Battlogg et al.

(10) Patent No.: US 8,967,343 B2
(45) Date of Patent: Mar. 3, 2015

(54) SHOCK ABSORBER FOR A BICYCLE

(75) Inventors: Stefan Battlogg, St. Anton I.M. (AT);
Martin Walthert, Aarberg (CH);
Gernot Elsensohn, St. Anton I.M. (AT);
Jürgen PöSel, Bludenz (AT)

(73) Assignee: DT Swiss Inc., Grand Junction, CO (US)

( * ) Notice: Subject to any disclaimer, the term of this patent is extended or adjusted under 35 U.S.C. 154(b) by 263 days.

(21) Appl. No.: 13/358,197

(22) Filed: Jan. 25, 2012

(65) Prior Publication Data

US 2012/0186922 A1    Jul. 26, 2012

(30) Foreign Application Priority Data

Jan. 25, 2011   (DE) .......................... 10 2011 009 405

(51) Int. Cl.
*F16F 9/53*   (2006.01)
*B62K 25/04*   (2006.01)
*F16F 9/46*   (2006.01)

(52) U.S. Cl.
CPC ........... *B62K 25/04* (2013.01); *B62K 2025/044* (2013.01); *B62K 2025/047* (2013.01); *B62K 2025/048* (2013.01); *F16F 9/46* (2013.01)
USPC ..................................... 188/267.2; 188/266.2

(58) Field of Classification Search
USPC ................. 188/267, 267.1, 267.2, 313, 266.2
See application file for complete search history.

(56) References Cited

U.S. PATENT DOCUMENTS

| 4,973,854 | A | * | 11/1990 | Hummel ..................... 267/64.26 |
| 5,971,116 | A | | 10/1999 | Franklin |
| 8,393,446 | B2 | * | 3/2013 | Haugen ..................... 188/266.7 |
| 8,489,278 | B2 | * | 7/2013 | Song et al. .................... 701/37 |
| 2009/0192673 | A1 | | 7/2009 | Song et al. |
| 2010/0276906 | A1 | * | 11/2010 | Galasso et al. ............. 188/266.2 |
| 2010/0327542 | A1 | | 12/2010 | Hara et al. |
| 2011/0127706 | A1 | | 6/2011 | Sims et al. |

FOREIGN PATENT DOCUMENTS

DE     3901256 A1 *  8/1989
GB     2461892 A     1/2010

* cited by examiner

*Primary Examiner* — Melanie Torres Williams
(74) *Attorney, Agent, or Firm* — Laurence A. Greenberg; Werner H. Stemer; Ralph E. Locher

(57) ABSTRACT

A shock absorber for a bicycle has a damper device with first and second damper chambers. The damper chambers are connected by way of a controllable throttle valve. A changeable electronic unit has a control device for controlling the electrically controllable throttle valve. The control device thereby influences the damper characteristics.

20 Claims, 4 Drawing Sheets

SHOCK ABSORBER FOR A BICYCLE

CROSS-REFERENCE TO RELATED APPLICATION

This application claims the priority, under 35 U.S.C. §119, of German patent application DE 10 2011 009 405.9, filed Jan. 25, 2011; the prior application is herewith incorporated by reference in its entirety.

BACKGROUND OF INVENTION

Field of the Invention

The present invention relates to a shock absorber for a muscle-powered, or partly muscle-powered vehicle and in particular a bicycle. The shock absorber comprises a damper device having a first and a second damper chamber connected with one another via at least one controllable throttle valve.

In the prior art many different types of bicycle dampers have become known which serve for the damping of shocks. These shock absorbers may be employed as rear wheel dampers for the damping of shocks to the rear wheels or they are configured as suspension forks, serving for the damping of shocks to front wheels.

Dampers for bicycles are operated e.g. with a damping fluid such as oil. For damping, the damping fluid is conveyed from a first damping chamber to a second damping chamber through a valve gate throttling the flow. The size of the valve aperture determines the damping strength. For application in bicycles it is desirable to set the damping strength load-related. Thus for example weak shocks may be damped at less strength than heavy shocks.

Optimal damping is also related to the terrain characteristics. For rides on a road, on a forest path; or directly off-road, different damping settings are optimal.

For real-time controlling these dampers, electrically controllable throttle valves have therefore become known. For example, United States Patent Application Publication US 2009/0192673 A1 describes a bicycle having a controllable damper. The damper comprises an adjustable valve wherein the valve aperture size is controlled by an electric motor.

Shock absorbers for bicycles have also become known which are operated by way of a magneto-rheological fluid, which forms the damping fluid. In a damping duct of a controllable throttle valve a magnetic field can be generated causing chain-formation of the particles in the magneto-rheological fluid along the field lines of the magnetic field so as to correspondingly dampen the flow through the throttle valve.

All the electrically controllable shock absorbers require use of electric energy for controlling the shock absorbers. To maintain operation of such a shock absorber independently of a generator such as a bicycle dynamo, batteries are as a rule provided supplying the energy required.

Electrically controllable shock absorbers allow real-time controlled operation of the shock absorber. Sensor signals may be analyzed. Response to changing ambience conditions is virtually instantaneous for setting the desired or optimal conditions.

These flexibly controllable shock absorbers allow setting and adjustment of many parameters. An unfavorable combination of different parameters may bring about undesirable or even adverse results. Beginners can be overtaxed by a large number of adjustment options.

Therefore, for beginners a shock absorber makes sense providing just a few or only the most important setting options. Advanced users or experts, however, expect a larger number of setting options and they are aware that a combination of adverse settings may lead to negative results. Based on their experience they know to avoid these settings. Advanced users or experts therefore desire a shock absorber allowing many setting options.

There is the drawback, however, that a beginner who has initially bought a model having a reduced number of setting options, must later buy a new shock absorber so as to attain further setting options.

SUMMARY OF INVENTION

It is accordingly an object of the invention to provide a shock absorber for a bicycle which overcomes the above-mentioned disadvantages of the heretofore-known devices and methods of this general type and which provides for a shock absorber for an at least partially muscle-powered vehicle, and in particular for a bicycle, that is suitable to be employed both by beginners and by advanced users or experts.

With the foregoing and other objects in view there is provided, in accordance with the invention, a shock absorber for a muscle-powered or partially muscle-powered vehicle, in particular for a bicycle. The shock absorber comprises:

a damper device having a first damper chamber and a second damper chamber, and at least one controllable throttle valve fluidically connecting the first and second damper chambers to one another; and at least one interchangeable electronic unit having at least one control device configured to control the controllable throttle valve for influencing damper properties of the damper device.

In other words, the objects of the invention are achieved by a shock absorber for a (at least partially) muscle-powered vehicle, and in particular for a bicycle, which has at least one damper device having a first damper chamber and a second damper chamber which are interconnected via at least one controllable throttle valve. At least one exchangeable electronic unit is provided which comprises at least one control device for controlling the controllable throttle valve by means of the control device for influencing the damper characteristics.

The shock absorber according to the invention has many advantages. A considerable advantage of the shock absorber according to the invention is the fact that the exchangeable electronic unit allows to use another electronic unit having a simpler or more complex control device. In this way a simple exchange of the electronic unit allows to expand or restrict the function and control options of the shock absorber according to the invention.

The throttle valve is in particular controllable electrically and preferably electronically. It is also possible for a mechanically adjustable throttle valve to be adjustable via an electrically or magnetically adjustable adjusting device.

The changeable electronic unit may, other than the control device, also comprise an operating device serving for operating the shock absorber. Various electronic units may comprise different or no operating units to thus allow different settings to the shock absorber according to the invention.

While an electronic unit offers only a few or even no setting options to a beginner, an electronic unit may for an advanced user comprise for example setting options for the damping strength and optionally the spring strength to which end for example an additionally activated and deactivated spring or spring chamber may be provided. It is also possible to activate a lockout via the operating unit thus virtually prohibiting compressing and/or rebounding. It is possible for different electronic units to have similar or even identical control devices while comprising operating devices showing marked differences in their scopes of function. It is also possible for various electronic units to differ by way of enabling properties which are enabled following activating of a code or the like. The proper codes may be provided by way of serial numbers.

It is also possible and preferred to provide setting options for different operating modes and in particular different terrains at or via an electronic unit for advanced users or experts. Also possible are setting options for different riding styles such as training rides, tour rides, race riding, etc.

In all of the configurations it is possible and preferred to provide an exchangeable battery unit. The battery unit may be accommodated at the electronic unit for exchange as one unit with the electronic unit. Or else it is possible to provide the battery unit to be provided at the shock absorber for separate exchange.

It is possible and preferred to provide an incorporation of the battery unit in the electronic unit so as to provide different electronic units having different energy capacities. It is also preferred to dispose battery units having different capacities at an electronic unit or the shock absorber itself.

Employing higher capacity battery units may for example make sense for an intended all-day trip or if the shock absorber should and must be supplied with energy over several days or even weeks. If, however, only a short race or a short trip is intended, a battery unit having lower capacity and thus a smaller range but also a lower weight may be used.

It is also possible and preferred for the battery unit to accommodate conventional and commercially available batteries. In this way exchanges can be ensured virtually at any time.

It is also possible and preferred to employ rechargeable batteries to be recharged by means of a special or a conventional charger.

Particularly preferably the shock absorber comprises a damper device in which the first damper chamber and the second damper chamber are provided in one joint housing and wherein the first damper chamber and the second damper chamber are variably separated from one another by at least one damper piston.

Preferably the damper device is provided with a rheological fluid that can be influenced by a field. Preferably the electrically controllable throttle valve comprises at least one damping duct on which a field generating device can apply a field. In particular does this field generating device serve to influence magneto-rheological fluids. Preferably an electric coil is at least periodically employed for generating the field.

In all of the configurations it is preferred for the electronic unit to comprise an operating device comprising in particular at least two operating knobs and at least one display. In simple cases operating knobs marked "+" and " " may be provided for increasing or decreasing damping and an optical display such as a light-emitting diode, for acknowledging input or for displaying operational states.

It is also possible and preferred for the display to be configured for the graphic illustration of data and/or to be configured touch-sensitive, thus at the same time serving for capturing operator input.

In all of the configurations it is preferred to provide for mounting at least two different types of electronic units, the electronic units differing in complexity and/or in their operating and setting options and/or in their running times.

It is possible for an electronic unit to be provided as an autonomous unit which controls the shock absorber in particular fully automatically. To this end the electronic unit may for example access sensors in the shock absorber or within the electronic unit, thus making sensor-controlled adjustments to the shock absorber.

It is also possible for the electronic unit to access previously stored data, for example retrieving previously stored or deposited settings by way of position data or the like. Such an autonomous electronic unit may operate without any other operating unit while still performing highly complex controlling procedures. For a beginner this may be ideal.

For advanced users or experts, different electronic units may be provided wherein the different electronic units may be readily exchangeable in particular without requiring any tools. By means of exchanging an electronic unit the user may thus increase the flexibility of control and optionally also the function.

A simple beginner's version operates e.g. fully automatically without any user interaction and its control parameters can be changed for example only by the dealer or coaches of a team. The incorporated intelligent control device provides for automatically always setting a suitable operating mode. This version may make sense e.g. for bicycles for rent.

A version provided for occasional riders offers manual setting options in a local operating device. The damping can for example be increased or decreased, or a lockout may be activated for deactivating the damping.

A version for advanced users and/or a version for experts may offer further options. In preferred configurations the electronic unit is provided and configured for data exchanges with at least one other control device.

To this end the electronic unit may be equipped with a network interface configured for wire-bound and/or wireless data exchanges. The electronic unit may comprise at least one radio network interface and/or a cable connection. It is also possible to provide multiple network interfaces. For example a cable connection may be provided and/or a wireless connection or multiple wireless connections may be set up.

Receiving and storing position signals such as GPS data may be possible. It is also possible to exchange data via a mobile radio interface or from satellites. These unidirectional or bidirectional data connections may for example also allow data exchanges with the internet. This allows to access data banks available in the internet such that the user may optionally at any time have a comparison with other users or for example against previously traveled rounds.

Another control device is in particular configured as a central control device disposed centrally for example at the bicycle handlebar. Such a control device may be provided with a dedicated display device for example to also output data about the traveling speed, the real time, route data such as the average speed and the like.

This central control device may be used for controlling multiple bicycle components and in particular shock absorbers at the vehicle. For example the suspension fork and the rear wheel damper of a bicycle may be controlled simultaneously. For example when the rider begins a steep uphill ride, the suspension fork may be lowered automatically and the settings for the rear wheel damper may be adapted accordingly to provide the most comfortable uphill ride possible.

The connection of the central control device with the electronic units of each of the shock absorbers may occur according to one of the standards for wireless signal transmission wherein transmission may be provided with unique identification numbers and/or encrypted. Signal transmission may for example occur according to the ANT+ standard. Or else a connection of the individual components via WLAN or BLUETOOTH or other known standards is possible as well.

In all of the configurations it is preferred to provide at least one sensor taken from a group of sensors comprising location and position sensors such as GPS sensors, speed and acceleration sensors, torque and weight sensors, pressure sensors, and damper-integrated position sensors. It is also possible to employ multiple different or similar sensors.

With the above and other objects in view there is also provided, in accordance with the invention, at least one damper device formed with a first damper chamber and a second damper chamber, and at least one controllable throttle valve connected said first damper chamber and said second damper chamber to one another; a control device configured to control said at least one controllable throttle valve; and at least one exchangeable electronic unit having a communication device for operating said control device by way of said communication device.

That is, in an alternative configuration according to the invention the shock absorber is provided for an at least partially muscle-powered vehicle and in particular a bicycle and comprises at least one damper device having a first and a second damper chamber. The first damper chamber is in connection with the second damper chamber via at least one controllable throttle valve wherein at least one control device is provided for controlling the throttle valve. At least one changeable or exchangeable electronic unit is provided which comprises at least one communication device for operating the control device by way of the communication device.

The control device may be incorporated in the shock absorber such that the electronic unit does not comprise a control device. Different operating options and functions are realized through various operating devices and/or communication devices. For example a communication device may comprise a network interface to thus set up contact with a central control device via the communication device. In simple cases the communication device may be configured as an operating device.

In another configuration of a shock absorber for an at least partially muscle-powered vehicle and in particular a bicycle the shock absorber comprises at least one damper device comprising a first and a second damper chamber. The first damper chamber is in connection with the second damper chamber via at least one controllable throttle valve wherein at least one control device is provided for controlling the throttle valve. At least one changeable communication device and/or operating device is provided for operating the control device by means of the communication device.

Other features which are considered as characteristic for the invention are set forth in the appended claims.

Although the invention is illustrated and described herein as embodied in a shock absorber for a bicycle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The following provides for an exemplary implementation of the invention in the form of a bicycle 200 equipped with shock absorbers 100.

Figure 1:
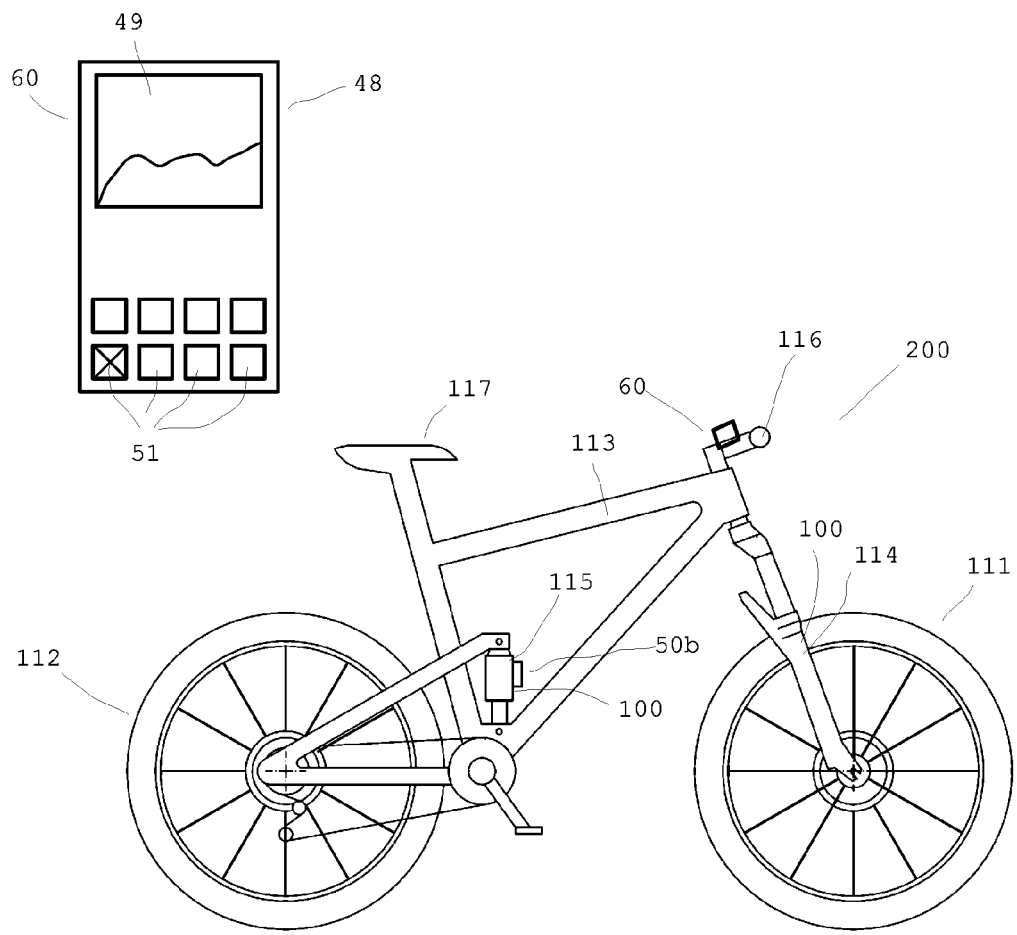
FIG. 1 a schematic view of a bicycle equipped with a shock absorber according to the invention.

Referring now to the figures of the drawing in detail and first, particularly, to FIG. 1 thereof, there is shown a schematic illustration of a bicycle 200 configured as a mountain bike and comprising a frame 113 and a front wheel 111 and a rear wheel 112. Both the front wheel 111 and the rear wheel 112 are equipped with spokes and may be provided with disk brakes. A gear shifting system serves to select the transmission ratio. Furthermore the bicycle 200 comprises a handlebar 116 and a seat or saddle 117.

The front wheel 111 is provided with a shock absorber 100 configured as a suspension fork 114 and the rear wheel is provided with a shock absorber 100 configured as a rear wheel damper 115. A central control device 60 is presently provided at the handlebar 116.

The central control device 60 may be employed as a suspension system, controlling both the suspension fork 114 and the rear wheel damper 115 in synchronicity. Control of the shock absorbers 100 and further bicycle components may be provided in dependence on many different parameters and also by way of sensor data. Optionally the suspension and/or damping characteristics of the seat post can be set.

Additionally each of the shock absorbers 100 comprises at least one control device 46 at an electronic unit 50c provided to be exchangeable. Instead of the electronic unit 50c an electronic unit 50a or an electronic unit 50b might be provided (see FIGS. 8 and 9). The various electronic units 50a to 50c may comprise at least one battery unit 61a to 61c. The battery units 61a to 61c may be exchanged together with the respective electronic unit or separately. For example rechargeable battery units may be provided which can be readily removed from the shock absorber together with the electronic unit 50a to 50c for recharging the electronic unit. It is also possible and preferred to employ commercially available batteries. Preferably fuel cells or the like can be employed as well. In the case of bicycles having electro-assist, energy supply may occur by way of the central battery unit. Also possible is assist or operation by a dynamo generator or the like.

Figures 8, 9:
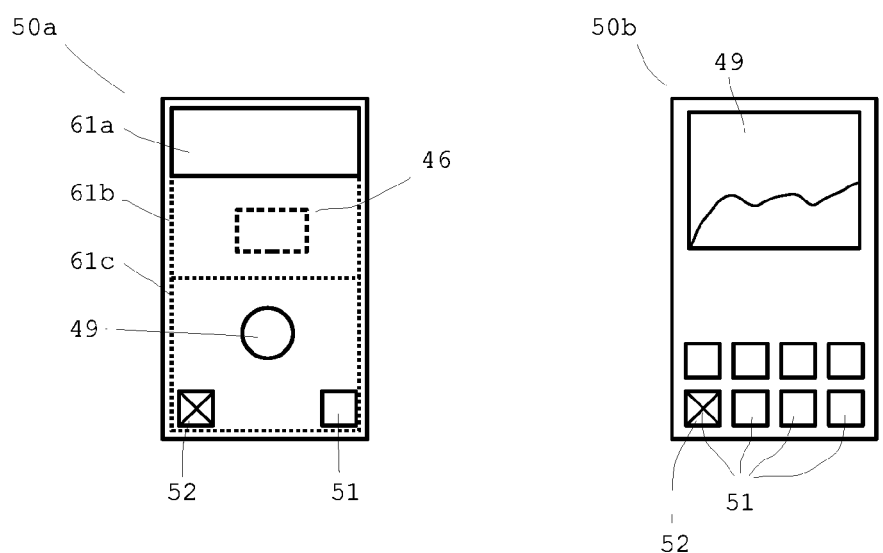
FIG. 8 another electronic unit for the shock absorber according to FIG. 3.
FIG. 9 yet another electronic unit for the shock absorber according to FIG. 3.

The electronic unit 50c is provided for advanced users, involving data exchanges with the central control device 60. In FIGS. 8 and 9 the electronic units 50a and 50b are illustrated schematically.

The present electronic unit 50c can at any time be replaced by another electronic unit 50a (see FIG. 8) operating autonomously with the incorporated control device 46. Then, no central control device 60 is provided or it serves purely as a bicycle computer.

It is also possible for the control device 46 or a control unit to be incorporated in the shock absorber wherein the control unit provides the basic functions. Operation then occurs via the electronic unit 50*a*, 50*b* or 50*c* via the central control device 60.

The control device 60 or the locally provided control devices 46 may largely provide control of the riding characteristics of the bicycle 200. While use is possible and preferred for purely muscle-powered bicycles, use with bi- and/or multi-cycles and in particular electro-assisted bicycles is also possible and preferred. By means of the control device 60 and/or the control devices 46 the damping characteristics of the suspension fork 114 and the rear wheel shock absorber 115 can be set in dependence on the currently set riding profile and on the other data provided to the control devices.

The central control device 60 is operated via an operating device 48. It is possible for the control device 60 to have a display device 49 and/or multiple operating knobs 51 and 52. It is also possible for the control device to be configured touch-sensitive or proximity-sensitive so as to allow operation by way of touching dedicated buttons or the like.

The control device 60 may then also serve as a bicycle computer, displaying data such as the current speed, and the average speed and/or kilometers per day, per tour, per lap and total. Also possible is displaying the current position, current altitude, or the route traveled or the route profile.

Figure 2:
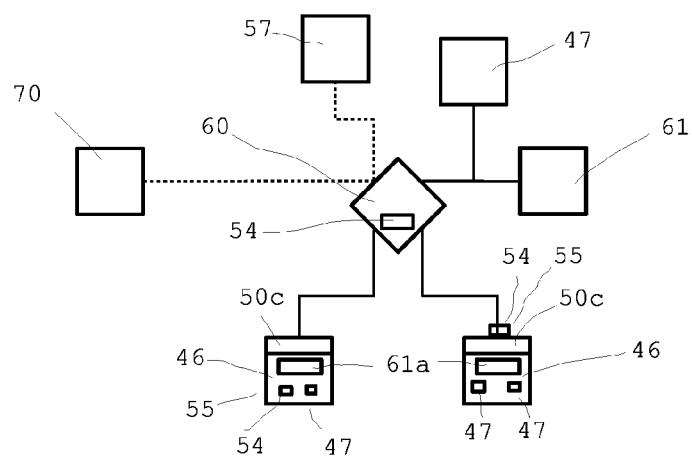
FIG. 2 a schematic view of the communication connections of the bicycle according to FIG. 1.

FIG. 2 shows a schematic illustration of the communication connections of the components involved. The central control device 60 may be connected with the individual components either by way of a wire-bound connection or wirelessly. The connection shown in a dotted line with the Internet 70 is a wireless connection. The control device 60 may be connected with the battery unit 61*a* or have its own energy supply. Furthermore the control device 60 can be connected with a sensor 47 or multiple sensors 47. The graphical operating unit 57 or display unit may again have a wireless connection with the control unit 60. The shock absorber 100 of the suspension fork 114 or the shock absorber 100 of the rear wheel damper 115 may be connected wireless or wire-bound. Connection occurs through network interfaces 54 which may be configured as radio network interfaces 55 or as cable connection 56.

Figure 3:
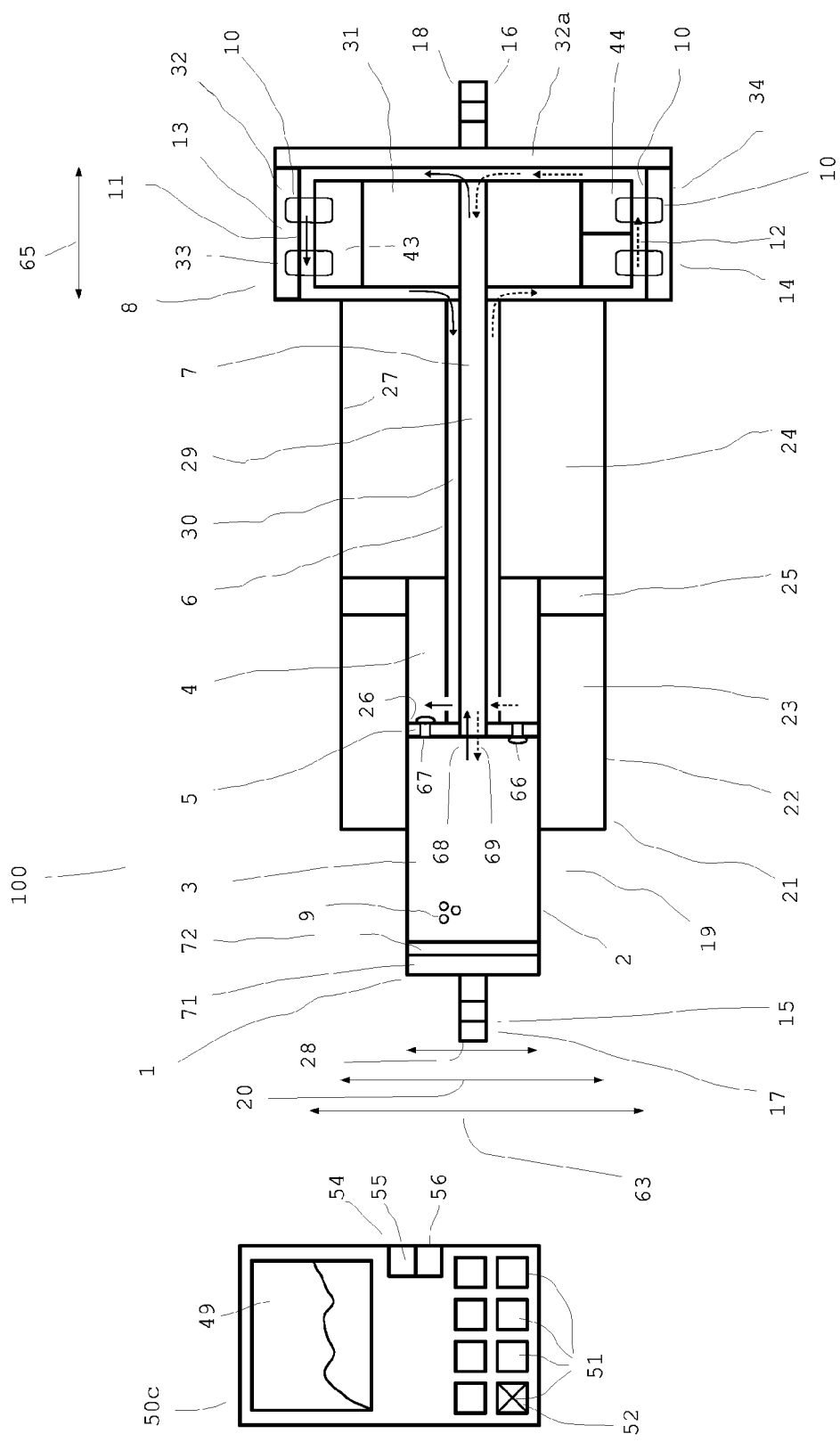
FIG. 3 a simplistic sectional view of a shock absorber of the bicycle according to FIG. 1 with an electronic unit.

FIG. 3 shows a simplistic view of a shock absorber 100 which is presently employed for example in the rear wheel damper 115.

The shock absorber 100 comprises a first end 15 and a second end 16. The shock absorber 100 is provided with a damper device 1 in a damper housing 2 and with a spring device 21 in a spring housing 22. The damper device 1 is located closer to the first end 15 and the spring device 21 is located closer to the second end 16. The first end is provided with a first force transfer section or connection 17 and the second end 16 is provided with a second force transfer section or connection 18.

Inside the damper housing 2 the first damper chamber 3 and the second damper chamber 4 are disposed which are separated from one another by a damper piston 5.

The first and the second spring chambers 23, 24 are separated by a spring piston 25 which is connected with the damper housing 2. The first spring chamber 23 is provided radially outwardly of the damper housing 2. The damper housing 2 dips into the spring device 21 with movement of the spring.

The outside 19 of the damper housing 2 serves as the sliding surface for the spring housing 22 and defines the first spring chamber 23 radially inwardly. Between the first spring chamber 23 and the damper housing 2 a seal is provided which is supported on the outside 19 of the damper housing 2. The spring piston 25 slides on the inside 27 of the spring housing 22.

As the shock absorber 100 compresses the volume of the second damper chamber 4 expands and also the volume of the first spring chamber 23 expands. In rebound, the volume of the first damper chamber 3 expands and also the volume of the second spring 24 chamber expands.

The damper piston 5 is retained by a piston rod 6 which extends from the damper piston 5 through the second damper chamber 4 out of the damper housing 2 and through the adjacent, second spring chamber 24 of the spring device 21. The damper piston 5 comprises a seal 26 towards the damper housing 2 causing a sealing by way of the magneto-rheological fluid via magnets incorporated in the piston.

The piston rod 6 in the present exemplary embodiment is configured double-walled, having a radially inwardly flow duct 29 and a radially outwardly flow duct 30 both of which form part of a flow duct 7. The flow duct 7 connects the first damper chamber 3 with the second damper chamber 4 wherein the fluid passing from the first damper chamber 3 into the second damper chamber 4 is firstly guided through the piston rod 6 out of the damper housing 2 to the exterior to the throttling device 8 from where it is guided through the external flow duct 29 of the piston rod 6 to the second damper chamber 4. For reducing the flow resistance the diameter of the piston rod can be expanded over conventional shock absorbers to provide an increased maximum flow cross-section. The fluid 9 is guided inside the piston rod 6 through the second spring chamber 24 to the throttling device 8 and back again. A throttle valve 45 is configured at the throttling device 8. The throttle valve 45 can be adjusted electrically and comprises at least two field generating devices 13 and 14 which are presently configured as magnetic field generating devices.

The arrows 68 shown in solid lines indicate the flow direction of the fluid 9 in the compression stage and the arrows 69 in dashed lines, the flow direction of the fluid 9 in the rebound stage.

Each of the field generating devices 13 or 14 may comprise one, two or more field generating units 33, 34 configured for example as coils 38, 39 having appropriate cores 40 and 41 so as to form a corresponding magnetic field 10 as electric current is applied. Each of the field generating units 33, 34 is configured as a magnetic device 31 for generating a magnetic field in the damping duct.

At least one damping duct 11, 12 is provided in the throttling device 8 for intentionally influencing the magneto-rheological fluid 9 passing through. The damping ducts 11, 12 may be aligned in parallel to the longitudinal axis of the shock absorber 100 and extend over a substantial part or even the entirety of a periphery of the throttling device 8.

Figure 4:
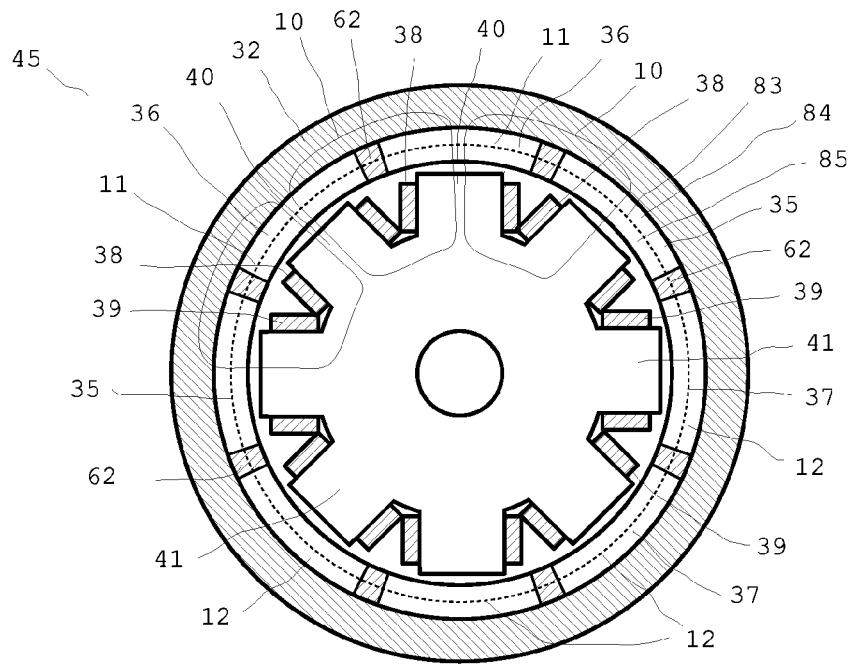
FIG. 4 a simplistic cross-sectional view of the throttling device of the shock absorber according to FIG. 3.

FIG. 4 shows a cross-section through the throttling device of the shock absorber 100 according to FIG. 3.

Preferably a radially outwardly magnetic ring conductor 32 is provided which radially outwardly defines the damping duct 11 or the damping ducts 11 and 12. The field generating units 33 and 34 etc. follow radially inwardly. The field generating units 33 and 34 are provided with a central, approximately sprocket-shaped or star-shaped body having radial projections, teeth, or cores 40, 41 around each of which a coil 38 or 39 is wound.

It is also possible for the field generating units 33 and 34 etc. to be provided radially outwardly while a magnetic ring conductor or multiple ring conductor segments are provided radially further inwardly.

Each one of the present total of eight different coils 38, 39 may be activated separately so as to apply different field strengths to respective damping ducts 11, 12 etc. or to portions of the entire damping duct.

In certain peripheral distances separators 62 are provided which act as magnetic isolators and which furthermore supply a defined, centered fastener of the field generating units 33, 34 in the ring conductor 32.

By way of the damping ducts 11, 12 extending ring-like around the piston rod 6 and by way of the radial distance of the damping ducts 11, 12 or the diameter 63 being larger than the inner diameter 28 of the second damping chamber the axial length 65 of the damping ducts can be considerably reduced. Presently the radial distance of the damping ducts 11, 12 or the diameter 63 is also larger than the diameter 20 of the spring device 21 (see FIG. 3). The maximum flow speeds occurring in the damping ducts 11, 12 are low due to the cross-sectional areas of the damping ducts 11, 12 being larger on the whole. If, however, the damping ducts were provided for example inside the damper piston 5 then, given the same height and length of the damping duct, the flow speeds in the damping ducts would be higher due to the considerably reduced diameter 28 of the damper piston. Then the damper piston 5 would have to have a correspondingly longer axial length which would result in a larger mounting space or would reduce the stroke length.

Intentional control of particular coils 38, 39 by means of the control device 46 allows to subject the damping ducts 11, 12 to fields of different strengths so as to generate different damping sections across the entire cross-sectional area. For example a bypass section 37 may be generated at a damping duct when the adjacent coils 39 are switched currentless such that no magnetic field or only a weak magnetic field acts. In this case the bypass section 37 acts as a bypass. When maximum electric current is applied to the coils 38 on both sides of the damping duct then a blocking section 36 will form which virtually prohibits any magneto-rheological fluid 9 from passing through.

In the illustrated example the entire damping duct 11, 12 can thus be subdivided into 8 sections having different characteristics corresponding to the current in the pertaining field generating units 33, 34. A transition section 35 may form when a magnetic field 10 is applied in one or multiple sections between blocking section 36 and bypass section 37 having a field strength between that in the blocking section 36 and the field of the bypass section 37.

Skillful arrangement and magnetization of the cores 40, 41 and magnetic stray fields also allow to achieve inhomogeneous areas within any one segment of the damping duct 11, 12.

Additionally to the throttle valve 45 further valves 66 and 67 may be provided for example in the damper piston 5 as illustrated in FIG. 3. These valves 66 and 67 are preferably configured as one-way valves and may be configured with a spring biased in its closed position. It is preferred to employ shims which allow passage in relation to forces. Valves configured as blow-off valves may e.g. offer overload protection.

Employing these valves 66, 67 or one of these two valves 66, 67 allows for example to have the electronic throttle valve 45 activated in the compression stage only while for example for the rebound stage the valve 66 is set fixed, allowing immediate transfer through the damper piston 5. Reversely it is also possible for the mechanical valve 67 to operate in the compression stage while flow in the rebound stage occurs by way of the throttling device 8.

The control device 46 is provided in the electronic unit 50c which is provided to be exchangeable. For beginners, an electronic unit 50a may be attached offering just a few adjusting options or even none at all to not overtax the user.

A user having gained sufficient experience may replace the electronic unit 50a by an electronic unit 50b or 50c or upgrade it so as to provide the user with more adjusting options and functions.

Thus for example a data store may be provided for capturing and storing tour data. Optionally any data previously stored in the control device or on a computer or in the internet may be downloaded to obtain optimal settings for an intended tour.

The shock absorber 100 may be provided with permanent magnets 43, 44 whose magnetic field strengths can be permanently changed in operation by appropriate magnetic pulses of the coils 38, 39.

Figure 5:
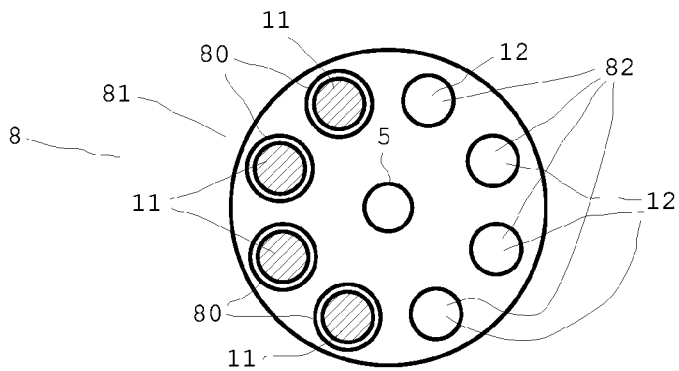
FIG. 5 another simplistic cross-sectional view of another throttling device.

FIG. 5 shows a simplistic cross-section of another throttling device 8 or a throttle valve 45 for a shock absorber according to FIG. 3 with a total of 8 damping ducts 11, 12 provided. Presently two groups or duct groups 81 and 82 are provided with four damping ducts 11 each, forming the duct group 81, and four damping ducts 12 each, forming the duct group 82. The duct group 81 is provided in one flow direction with one-way valves presently configured as shim valves 80 which allow passage of fluid e.g. in the compression stage only. This means that then all of the total of eight damping ducts 11 and 12 of the duct groups 81 and 82 are activated in the compression stage while in the rebound stage the four damping ducts of the duct group 81 are blocked by the respective shim valves 80. This already results in mechanically different characteristic damper curves for the compression stage and the rebound stage so as to require less electric energy for achieving the characteristic curve required. Reversed realization is also possible where in the compression stage the four damping ducts of the duct group 81 are blocked by the respective shim valves 80 while in the rebound stage all of the damping ducts are activated. These shim valves allow a simple mechanical definition of the maximum flow cross-section in one flow direction.

These additional valves may be located in the region of the damping duct or in another place of the damper such as the flow duct or the damping piston. Depending on the application a great variety of additional valves such as shim valves dependent on the flow direction and/or the pressure, valves dependent on the temperature or other parameters or else controllable electromechanical valves may be employed. These additional valves may block or enable flow through at least part of at least one damping duct, or increase flow resistance or form a bypass to the damping duct.

Furthermore at least one partition or partition wall 83 may be provided transverse to the magnetic field for segmenting into two sub-ducts 84, 85 at least one damping duct in the direction of the field lines. The partition wall 83 consists of a magnetic conductor. This allows to decrease the field strength required for a specific chain-formation of the magneto-rheological particles to thus allow very low energy requirement of the coil.

Figure 6:
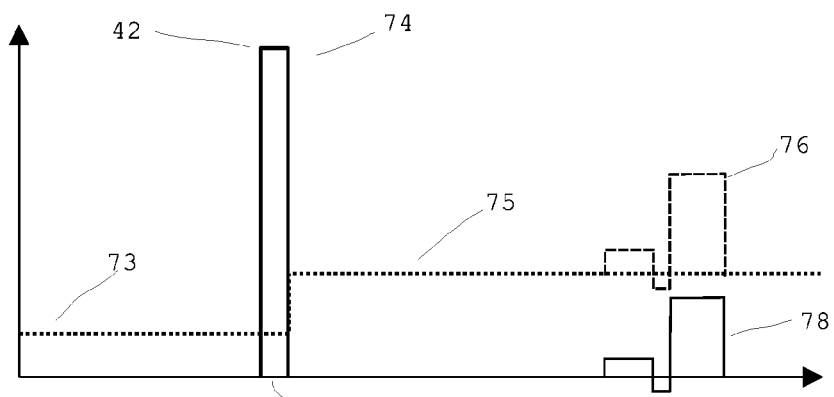
FIG. 6 a possible field strength curve over time.

FIG. 6 shows the function in changing or setting a desired magnetic field strength from a first magnetic field strength 73 to a second magnetic field strength 75. What is shown is the strength of the magnetic field over time. The field strength of the permanent magnet 43, 44 is shown in dotted lines while the magnetic field 74 generated by the electric coil 38 during the pulse 42 is inserted in a solid line.

It is clearly recognizable that the magnetic field strength 74 generated by the electric coil 38 is zero for most of the time since a magnetic field generated by the electric coil 38 is not required for normal operation and thus no electric energy is required.

A magnetic field 74 generated by the electric coil 38 is required only when changes to the magnetic field strength 73, 75 of the permanent magnet 43 are sought.

Thus the magnetic field strength 73 generated by the permanent magnet 43 firstly shows a lower value until the electric coil 38 triggers a magnetic pulse 42. The magnetic field strength 74 generated by the electric coil 38 shows a strength with which to permanently magnetize the permanent magnet 43, 44 at an appropriate strength.

For example the magnetic field strength of the permanent magnet 43, 44 may be increased from an initially lower field strength 73 to an increased field strength 75 to effect a higher damping strength or to close the damping valve 45.

While the pulse length 77 for the magnetic pulse 42 is very short and may be in the range of a few milliseconds, the permanent magnet 43, 44 subsequently permanently shows the high magnetic field strength 75 which, given a corresponding magnetic field strength 74 of the magnetic pulse 42, may attain saturation of the hard-magnetic material employed. The magnetic field strength 74 generated by the coil 38 during the magnetic pulse 42 causes a permanent change of the magnetic field strength of the magnet 43 from an initial magnetic field strength 73 to a magnetic field strength 75.

It is apparent in FIG. 6 that the energy savings compared to a conventional system continuously requiring current depends on the frequency of re-magnetizations. However, even in the case of frequent re-magnetizations for example once every second, the energy required may be less than in a similar system not involving remanence. When re-magnetization is activated only as needed, for example as road conditions change, the advantage over other systems becomes considerably clearer still.

Given an accordingly lower magnetization of the permanent magnet 43, 44, a correspondingly lower magnetic field is generated. A de-magnetization may be generated by an attenuating alternating magnetic field.

FIG. 6 furthermore schematically shows on the right in the diagram a situation in which the coil 38 is also used for time-based modification of the effective magnetic field. When the coil 38 is exposed only to a weak current 78 that is also e.g. variable over time, as is inserted on the right in FIG. 8 in a solid line, then the entirety of the effective magnetic field 76 is influenced accordingly and strengthened or attenuated in relation to its polarization. This also allows dynamically influencing the effective magnetic field 76 without changing the permanent magnetization of the permanent magnet 43 (field strength 75).

In analogy the other coils 38, 39 may be employed for influencing the other cores 40, 41. Influencing may occur synchronously. For generating different sections such as a transition or bypass section individual coils 38, 39 may be controlled differently.

Figure 7:
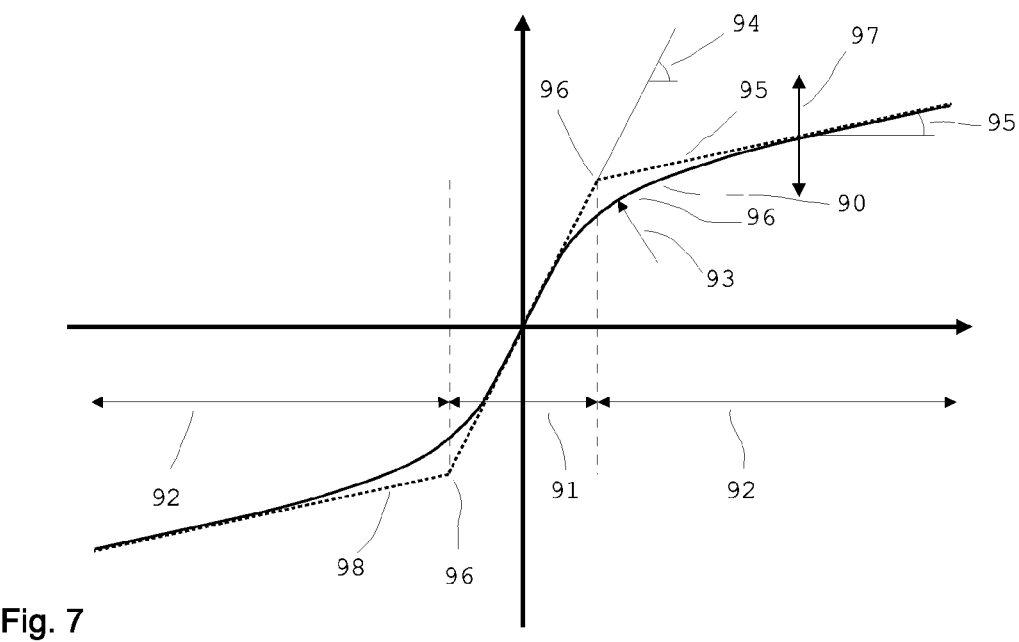
FIG. 7 the characteristic curve of a valve having a transition section.

FIG. 7 shows a characteristic damper curve 90 of the shock absorber 1 in a force-speed diagram of the damper piston. The low-speed range 91 and the high-speed range 92 are connected with a radius 93 by way of a gentle rounding. The characteristic curve is presently symmetrical in structure, showing the same curve for the rebound and the compression stages. Basically, however, different curves of the two stages are possible and desired.

In the shock absorber 100 the gradient 94 of the characteristic damper curve in the low-speed range 91 is substantially determined by the bypass section 37. In the high-speed range 92 the gradient 95 is substantially determined by the total cross-section of the damping ducts 11, 12 and by the strength of the field in the blocking section 36.

A transition section 35 with a magnetic field attenuating across its extension leads to an advantageous and non-linear contour and to the rounding which leads to a comfortable and safe operation.

Furthermore an arrow 97 is inserted indicating the effect of a magnetic field having different strengths. Given a higher magnetic field strength the characteristic curve shifts upwardly while with a weaker magnetic field it shifts downwardly.

Dotted lines show a characteristic damper curve 98 which results when a bypass section 37 is present but no transition section 35.

The gradient in the low-speed range 94 is adjustable by means of the portion of the bypass section 37. The larger the bypass section 37, the smaller the gradient. The zero passage is again generated by the bypass section 37 since damping fluid can at any time flow through the bypass section 37 without being influenced such that damper piston movement will already be triggered at weak forces.

The gradient in the high-speed range 95 is influenced by the shape of the entire flow duct and the damping ducts 11 and 12 and the set strength of the magnetic field 75 in the effective section or blocking section 36.

The range with the rounding which is significant for comfort and safety is rounded by way of the transition section 35 of the damping duct 11 or 12 so as to enable an ergonomic and safe operation. The size of the rounded range ensues from the size and shape of the transition section 35 which can be flexibly adjusted by corresponding adjustment of the strength of the magnetic fields of the field generating devices 13, 14.

Power supply may likewise be supported by means of a generator, dynamo or in particular a hub dynamo.

FIGS. 8 and 9 schematically illustrate two further electronic units 50a and 50b. The simple structure of the electronic unit 50a in FIG. 8 is provided for beginners having elementary knowledge and comprises 2 operating knobs 51 and 52 and a display 49 in the shape of a light-emitting diode. One of the operating knobs 51, 52 may be provided for increasing damping and the other, for decreasing damping.

In FIG. 8 three different battery units 61a, 61b and 61c are exemplarily inserted which can be alternatively attached to the electronic units 50a to 50c. A smaller and lighter variant 61a is suitable for races or short tours while for longer tours the larger and heavier battery units 61b and 61c having larger capacity are better suitable.

The electronic unit 50b in FIG. 9 may be largely identical with the electronic unit 50c in FIG. 3, offering a plurality of adjustment options. In this variant, autonomous control is provided by means of the incorporated control device 46. Data connections with a central control device cannot be established during rides.

Each of the variants of the electronic units 50a, 50b or 50c allows fully automatic operation. The categories and scope of the adjustment options may differ largely though. A plausibility check is preferably provided for all the operating options so as to prevent disadvantageous, damaging, or dangerous settings.

In another variant the shock absorbers are controlled via a central control device. For example with groups of cyclists traveling in a guided tour or in training, the guide or trainer can centrally operate controls for all of the riders. Controlling by way of previously stored data is likewise possible. In these cases every rider gets optimal settings even on unknown routes. In this operating mode, operator input may be ignored to thus provide a pure, fully automatic operation.

In all of the cases it is preferred that a third spring chamber is provided to be activated additionally for varying the suspension hardness.

The following is a list of reference numerals used in the above description. The list may aid the reader in the perusal of the specification:

1 damper device
2 damper housing
3 first damper chamber
4 second damper chamber
5 damper piston
6 piston rod
7 flow duct
8 throttling device
9 fluid
10 field
11, 12 damping duct
13, 14 field generating device
15 first end
16 second end
17 first connection
18 second connection
19 outside
20 diameter
21 spring device
22 spring housing
23 first spring chamber
24 second spring chamber
25 spring piston
26 seal
27 inside
28 diameter
29, 30 flow duct
31 magnetic device
32 ring conductor
33, 34 field generating unit
35 transition section
36 blocking section
37 bypass section
38, 39 coil
40, 41 core
42 pulse
43, 44 permanent magnet
45 throttle valve
46 control device
47 sensor
48 operating device
49 display
50a-c electronic unit
51, 52 operating knob
54 network interface
55 radio network interface
56 cable connection
57 graphical operating unit
60 control device
61a-c battery unit
62 separator
63 diameter
65 axial length
66, 67 valve
68, 69 arrow
70 internet
71 equalizing space
72 equalizing piston
73-76 field strength
77 duration
78 electric current
80 shim valve
81, 82 duct group
83 partition wall
84, 85 sub-duct
90 characteristic damper curve
91 low-speed range
92 high-speed range
93 radius
94, 95 gradient
96 break point
97 arrow
98 characteristic damper curve
100 shock absorber
111 front wheel
112 rear wheel
113 frame
114 suspension fork
115 rear wheel damper
116 handlebar
117 seat
200 bicycle

The invention claimed is:

1. A shock absorber for a muscle-powered or partially muscle-powered vehicle, the shock absorber comprising:
a damper device having a first damper chamber and a second damper chamber, and at least one controllable throttle valve connecting said first and second damper chambers; and
a rheological fluid contained in said dampler device, said rheological fluid to be influenced by a field, and said controllable throttle valve including at least one damping duct to be subjected to a field by way of a field generating device; and
at least one interchangeable electronic unit having at least one control device configured to control said controllable throttle valve for influencing damper properties of said damper device.

2. The shock absorber according to claim 1, wherein the vehicle is a bicycle and said damper device is configured for the bicycle.

3. The shock absorber according to claim 1, wherein said electronic unit comprises at least one operating device.

4. The shock absorber according to claim 3, wherein said at least one operating device comprises two or more operating knobs and at least one display.

5. The shock absorber according to claim 1, wherein said electronic unit includes at least one battery unit.

6. The shock absorber according to claim 1, wherein said at least one electronic unit is one of a plurality of mutually different types of electronic units with different respective complexities.

7. The shock absorber according to claim 1, wherein said electronic unit is an autonomous unit.

8. The shock absorber according to claim 1, wherein said electronic unit is configured for local control of the shock absorber by way of specifications of a central control unit.

9. The shock absorber according to claim 1, wherein said central control unit includes a graphic display.

10. The shock absorber according to claim 1, which further comprises at least one sensor connected to said electronic unit.

11. The shock absorber according to claim 10, wherein said sensor is a device selected from the group consisting of location and altitude sensors, GPS sensors, speed sensors, acceleration sensors, torque sensors, weight sensors, pressure sensors, and position sensors.

12. The shock absorber according to claim 1, wherein the vehicle is a bicycle and said damper device is configured for the bicycle.

13. A shock absorber for a muscle-powered or partially muscle-powered vehicle, the shock absorber comprising:
- a damper device having a first damper chamber and a second damper chamber, and at least one controllable throttle valve connecting said first and second damper chambers; and
- at least one interchangeable electronic unit having at least one control device configured to control said controllable throttle valve for influencing damper properties of said damper device, and wherein said electronic unit is configured for data exchange with at least one further control device.

14. The shock absorber according to claim 13, wherein said damper device contains a rheological fluid to be influenced by a field, and said controllable throttle valve comprises at least one damping duct to be subjected to a field by way of a field generating device.

15. A shock absorber for a muscle-powered or partially muscle-powered vehicle, the shock absorber comprising:
- a damper device having a first damper chamber and a second damper chamber, and at least one controllable throttle valve connecting said first and second damper chambers; and
- wherein said damper device contains a rheological fluid to be influenced by a field, and said controllable throttle valve having at least one damping duct to be subjected to a field by way of a field generating device; and
- at least one interchangeable electronic unit having at least one control device configured to control said controllable throttle valve for influencing damper properties of said damper device, and wherein said electronic unit is equipped for data exchange with at least one network interface configured for wire-bound and/or wireless data exchanges.

16. A shock absorber for a muscle-powered or partially muscle-powered vehicle, the shock absorber comprising:
- a damper device having a first damper chamber and a second damper chamber, and at least one controllable throttle valve connecting said first and second damper chambers;
- at least one interchangeable electronic unit having at least one control device configured to control said controllable throttle valve for influencing damper properties of said damper device; and
- an exchangeable battery unit from a plurality of battery units having differing capacities.

17. The shock absorber according to claim 16, wherein said damper device contains a rheological fluid to be influenced by a field, and said controllable throttle valve comprises at least one damping duct to be subjected to a field by way of a field generating device.

18. A shock absorber for a muscle-powered or partially muscle-powered vehicle, the shock absorber comprising:
- a damper device having a first damper chamber and a second damper chamber, and at least one controllable throttle valve connecting said first and second damper chambers; and
- at least one interchangeable electronic unit having at least one control device configured to control said controllable throttle valve for influencing damper properties of said damper device, and wherein said electronic unit is configured for power supply from different types of battery units.

19. The shock absorber according to claim 18, wherein said damper device contains a rheological fluid to be influenced by a field, and said controllable throttle valve comprises at least one damping duct to be subjected to a field by way of a field generating device.

20. The shock absorber according to claim 18, wherein said different types of battery units are selected from the group consisting of one-way batteries, rechargeable batteries, and fuel cell batteries.

* * * * *